Patented Dec. 26, 1933

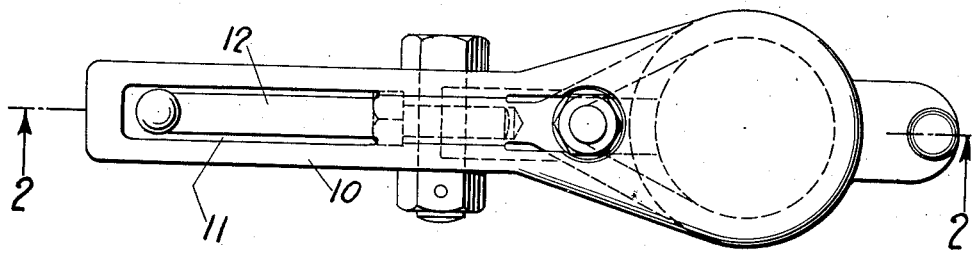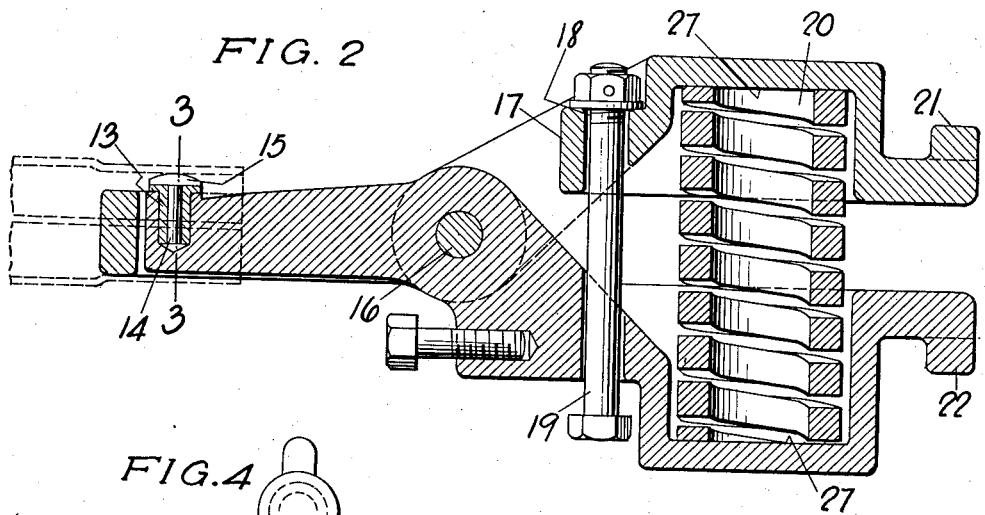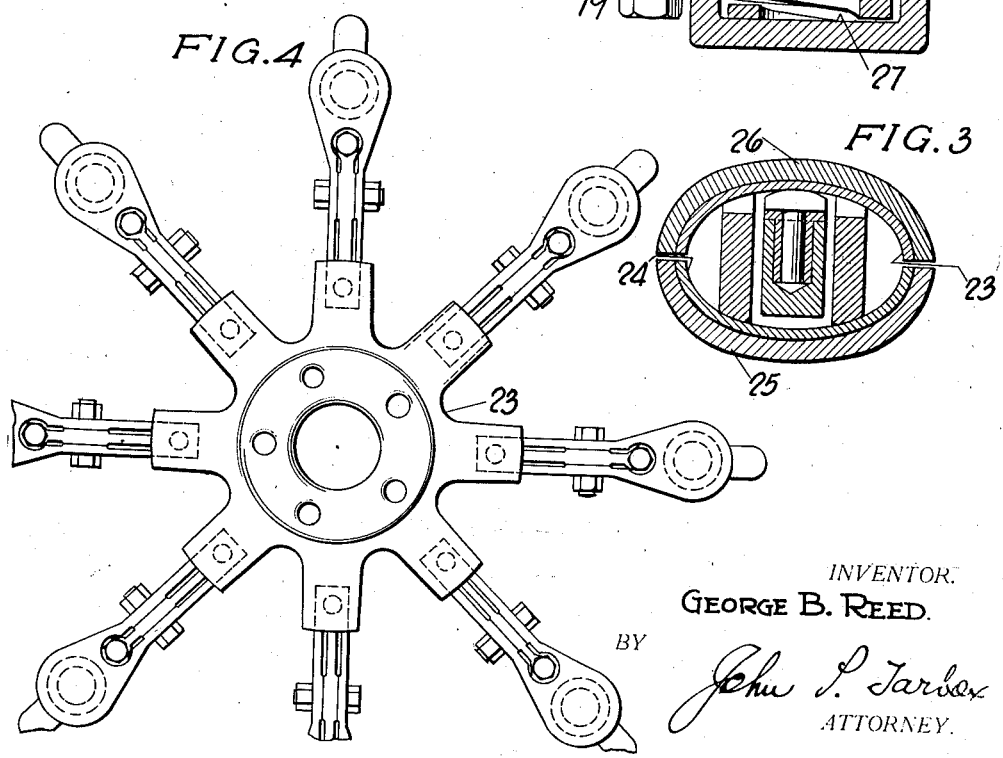

1,940,919

UNITED STATES PATENT OFFICE 1,940,919

WELDING TOOL

George B. Reed, Innsbruck, Austria, assignor to Edw. G. Budd Mfg. Company, Philadelphia, Pa., a corporation of Pennsylvania Application August 15, 1930, Serial No. 475,863
Renewed May 9, 1933

9 Claims. (Cl. 219—4)

My invention relates to a method of welding complemental concave elements to each other along their meeting edges, in order to effect a fusion thereof and thereby produce a unitary article. It constitutes a detailed improvement over the method and certain features of the machine embodied in the joint application of John P. Tarbox, Arthur F. Hanson and George B. Reed, Serial No. 335,247, filed January 28th, 1929.

It has been my object to improve on the method of that case by simplifying and expediting it. The welding method in that application involved the application of internal and external pressure to the parts to be welded along substantially co-extensive zones of considerable extent, these zones extending in this case throughout the length of the spoke portion of the wheel to be welded. This entails a substantial movement of the internal clamping members and requires expensive clamps.

I have discovered that by applying internal pressure in spaced zones suitably located, I can obtain an extensive weld of the nature disclosed in that application without the use of elongated internal clamps. I, therefore, effect a saving, not only in the cost of material, but in the time required to arrange the parts in welding position and complete the weld.

A further object of my invention has been to improve the design of the tool which internally clamps the complemental parts to be welded within the welding dies.

Other objects of my invention will be obvious from a reading of the attached specification in the light of drawing, in which:—

Fig. 1 represents a plan view of my improved tool for internally clamping the parts to be welded.

Fig. 2 is a sectional view on the line 2—2 of Fig. 1.

Fig. 3 is a sectional view on the line 3—3 of Fig. 2 showing a pair of welding dies applied to the wheel, and Fig. 4 is a plan view of a series of my improved internal clamps applied to a pair of wheel stampings, the welding dies being omitted for the purpose of clearness of illustration.

In the afore-mentioned copending application, a method of welding was disclosed in which yielding pressure was applied internally and externally of a pair of concave stampings during the flash welding thereof. According to the method of that application, yielding pressure was applied interiorly of the wheel stampings which constituted the article to be welded, in order to clamp them against the welding dies. This pressure was gradually overcome by means of a greater pressure applied externally of the wheel stampings. This external pressure thereby effected a yielding approach of the wheel parts to each other during the flash welding operation. By a suitable manipulation of the pressure, the wheel parts were not only yieldably clamped to the dies, but were held in properly spaced relationship during the flashing incident to the flash welding operation. After this flashing was completed, a further application of external pressure effected the final push-up to completely fuse the wheel parts together.

In the method disclosed in that application, a pair of elongated internal clamps were used, these clamps extending throughout substantially the entire spoke portion of the wheel, in order to effect a uniform application of pressure. This renders a very considerable movement of the clamping means necessary in the insertion and withdrawal thereof throughout the spoke ends, thereby rendering the process of welding the wheel halves unduly slow.

The clamps used in that application were also so very expensive as to involve a considerable weight of metal and a large amount of machining was necessary in the manufacture of these clamps, the cam portion which effected a separation of the clamps requiring a great deal of machine work.

By my improved method, I have obviated both of these difficulties. I have discovered that by selecting appropriate zones of application, I can obtain an effective weld without clamping the wheel parts interiorly over any substantial extent of their area. My improved method, therefore, consists in the application of pressure over substantially small zones within the interior of the spoke halves during the welding operation.

In order to effectively practice my improved method, I have devised a simple and inexpensive tool for insertion into the ends of the complemental spoke portions. This tool embodies a lower jaw 10 having a rectangular opening 11 extending longitudinally thereof. An upper jaw 12 is pivoted to this lower jaw as indicated at 16. This upper jaw is provided with a socket adjacent its extreme outer end which is provided with a bushing 13 of bakelite or other suitable insulating material adapted to receive a wear pin 14 having a head 15 attached to abut the upper wheel portion. The lower jaw 10 is provided with a lug 17 which is cut away as indicated at 18 to receive a bolt 19 which extends through the opening 18 and an aligned opening in the jaw. The jaws are provided with complemental socketed portions 27 adapted to receive a spring 20 which tends to urge them apart. The jaws are provided at their rear ends with a pair of lugs 21—22 to receive a suitable tool or machine fixture for manipulating them to compress them against the spring 20.

In the operation of my improved tool in the performance of the method of my invention, the wheel halves are first assembled in the welding machine and pressure is then applied to the lugs 21—22 to compress the jaws of my clamping tool. The jaws are then inserted within the spoke ends as indicated in Fig. 2 and the pressure is then released from the lugs 21—22. The compression of the spring at once tends to force the jaws apart and the wheel portions are, of course, forced apart with the jaws. The pressure of the spring is exerted against the upper and lower welding dies and during the flash welding operation. It is varied to effect a movement thereof as described in the aforesaid application to effect a flash welding operation upon the wheel parts. The upper and lower welding dies are indicated diagrammatically in Fig. 3 at 25 and 26. The wheel parts are separated by a series of clamps during the flashing operation, and after this operation is completed, a larger degree of pressure is exerted upon the opposed welding dies and forces the wheel parts together to effect a fusion thereof.

In the particular arrangement shown in the drawing a single tool is inserted into each spoke by the use of a pair of spaced points of contact in each spoke. I am thus enabled to weld the entire contacting faces of the complemental sections, including both nave and spoke portions.

It will be obvious to those skilled in the art that I simplify the method involved in the aforementioned application and simultaneously cheapen the machine and facilitate the welding of the parts.

While I have illustrated my improved method and welding tool in connection with the welding of an artillery wheel, I wish it to be understood that I do not intend to limit myself to such application, as it may equally well be used in connection with the welding of other articles.

Modifications will be obvious to those skilled in the art, and therefore, I do not wish to be limited except by the limit of the subjoined claims as interpreted in the light of the generic spirit of my invention.

What I claim is:

1. A tool for yieldingly spacing apart complemental members which are to be secured together along opposed edges to form hollow articles comprising a pair of pivoted jaws arranged to enter between the members, and lie, during the joining together thereof, within the hollow of the article, one of said jaws comprising an elongated centrally perforated member and the other of said jaws pivotally connected thereto and arranged for interiorly nesting relation within said first-named jaw.

2. A tool for yieldingly spacing concave members which comprises a pair of elongated pivoted jaws arranged to enter the concavities of said members one of said jaws including a U-shaped portion and the other arranged to pivot within the U-portion of the first-named jaw, yielding means for urging said jaws apart and projections on said jaws arranged to coact with actuating means in the manipulation of said tool.

3. A tool for yieldingly spacing concave members comprising an outer jaw arranged to enter the concave portion of one of said members, said jaw being cut away interiorly throughout a portion of its length, an inner jaw pivoted to said outer jaw and having a portion arranged to be received within the cut away portion of said outer jaw, yielding means for urging said jaws apart, and means on said inner jaw adapted to abut the concave portion of the other of said concave members.

4. A tool for yieldingly spacing apart complemental members which are to be secured together along opposed edges to form hollow articles, comprising a pair of pivoted jaws arranged to enter between the members and lie during the joining together of said members within the hollow of said article, one of said jaws including a U-shaped portion, and the other arranged to pivot within the U-portion of said first-mentioned jaw, and yielding means for urging said jaws apart, and projections on said jaws arranged to co-act with actuating means in the manipulation of said tool.

5. A tool for yieldingly spacing apart complemental members which are to be secured together along opposed edges to form hollow articles, comprising a pair of elongated pivoted jaws arranged to enter between said members and lie within the hollow of said article during the joining together of said members, one of said jaws including a U-shaped portion, and the other arranged to pivot within the U-portion of said first-named jaw, and cup-shaped projections on said jaws, and yieldable means positioned within said cup-shaped portions and means limiting the motion of said jaws due to said yielding means, and projections on said cup-shaped portions arranged to co-act with actuating means in the manipulation of said tool.

6. A tool for yieldingly spacing complemental members which are to be secured together along opposed edges to form hollow articles, comprising a pair of pivoted jaws arranged to enter between the members and lie within the hollow of said article during the joining together of said members, one of said jaws providing a two-point engagement with one of said complemental members, and the other of said jaws providing a substantially single point engagement with the other of said complemental members, and yielding means for urging said jaws apart while positioned interiorly of said complemental members during the joining together thereof.

7. A tool for yieldingly spacing complemental members which are to be secured together along opposed edges to form hollow articles, comprising a pair of pivoted jaws arranged to enter between the members and lie within the hollow of said article during the joining together of said members, one of said jaws providing a two-point engagement with one of said complemental members, and the other of said jaws providing a substantially single point engagement with the other of said complemental members and between the said two-point engagement, and yielding means for urging said jaws apart while positioned interiorly of said complemental members during the joining together thereof.

8. A tool for yieldingly spacing complemental members which are to be secured together along opposed edges to form hollow articles, comprising a pair of pivoted jaws arranged to enter between the members and lie within the hollow of said article during the joining together of said members, one of said jaws providing an extended engagement with one of said complemental members, and the other of said jaws providing a substantially single point engagement with the other of said complemental members, and yielding means for urging said jaws apart while positioned interiorly of said complemental members during the joining together thereof.

9. A tool for yieldingly spacing complemental members which are to be secured together along opposed edges to form hollow articles, comprising a pair of pivoted jaws arranged to enter between the members and lie within the hollow of said article during the joining together of said members, one of said jaws providing an extended engagement with one of said complemental members, and the other of said jaws providing an engagement with the other of said complemental members which is relatively restricted with respect to the extended engagement of the other jaw, and yielding means for urging said jaws apart while positioned interiorly of said complemental members during the joining together thereof.

GEORGE B. REED.